United States Patent

Kaspar

[11] Patent Number: 5,848,664
[45] Date of Patent: Dec. 15, 1998

[54] METHOD AND APPARATUS FOR HYDROSTATICALLY DRIVING A VEHICLE WITH EACH DRIVABLE WHEEL DRIVEN BY AT LEAST ONE HYDRAULIC MOTOR CONNECTED TO AT LEAST ONE HYDRAULIC SOURCE

[75] Inventor: Ernst Kaspar, Munderkingen, Germany

[73] Assignee: EC Engineering & Consulting Spezial-maschinen GmbH, Ulm, Germany

[21] Appl. No.: 637,675

[22] PCT Filed: Oct. 25, 1994

[86] PCT No.: PCT/EP94/03496

§ 371 Date: Jul. 24, 1996

§ 102(e) Date: Jul. 24, 1996

[87] PCT Pub. No.: WO95/11815

PCT Pub. Date: May 4, 1995

[30] Foreign Application Priority Data

Oct. 29, 1993 [EP] European Pat. Off. .............. 93 117621

[51] Int. Cl.⁶ .................................................. B60K 17/356
[52] U.S. Cl. ........................... 180/308; 180/248; 180/197
[58] Field of Search ..................... 180/305, 307, 180/308, 233, 245, 246, 247, 248, 249, 197

[56] References Cited

U.S. PATENT DOCUMENTS

| 3,053,043 | 9/1962 | Knowler ................................... 180/308 |
| 3,302,741 | 2/1967 | Brazuk ..................................... 180/248 |
| 3,344,879 | 10/1967 | Glomb et al. ............................ 180/308 |
| 3,552,516 | 1/1971 | Beard ....................................... 180/308 |
| 3,865,207 | 2/1975 | Schwab et al. ........................... 180/308 |
| 3,894,606 | 7/1975 | Hunck et al. ............................. 180/308 |
| 5,201,570 | 4/1993 | Heren et al. .............................. 303/10 |

FOREIGN PATENT DOCUMENTS

0479800 4/1992 European Pat. Off. .......... F16H 3/70

*Primary Examiner*—Kevin Hurley
*Attorney, Agent, or Firm*—Rothwell, Figg, Ernst & Kurz

[57] ABSTRACT

In a process for hydrostatically driving a vehicle comprising at least two ideal axles (12) of which each has at least one drivable wheel (11), each drivable wheel (11) being driven by at least one hydraulic motor (9) connected to at least one hydraulic source (6), and the driving power being transmitted from a hydraulic motor (9) via a transmission system (10, 35) to the respective wheel (11), the vehicle is to be usable under different performance requirements and is to be produced and operated in a simple and inexpensive manner. This is achieved in that the drivable wheels (11) are initially driven with a first identical ratio of the transmission system (10, 35), while, when a first load limit is reached, the effective drive of the wheels (11) of at least one ideal axle (12) is reduced and, when a second load limit is reached, the ratio of the transmission system (10, 35) is changed, and at least the wheels (11) driven before the first load limit are equally driven. Furthermore, a hydrostatic drive, in particular for performing the process, with at least two ideal axles which have each a drivable wheel (11), each drivable wheel (11) being connected to at least one hydraulic motor (9) connected to at least one hydraulic source (6) and a transmission system (10, 35) being arranged between each hydraulic motor (9) and the associated wheel (11), is suggested for the solution of the above-mentioned technical problem in such a manner that the ratio of the transmission system (10, 35) is variable.

41 Claims, 4 Drawing Sheets

METHOD AND APPARATUS FOR HYDROSTATICALLY DRIVING A VEHICLE WITH EACH DRIVABLE WHEEL DRIVEN BY AT LEAST ONE HYDRAULIC MOTOR CONNECTED TO AT LEAST ONE HYDRAULIC SOURCE

BACKGROUND OF THE INVENTION

1. Field of the Invention

The present invention relates to a process for hydrostatically driving a vehicle comprising at least two ideal axles which have each at least one drivable wheel, each drivable wheel being driven by at least one hydraulic motor connected to at least one hydraulic source, and the driving power of each hydraulic motor being transmitted via a transmission system to the respective wheel.

2. The Related Art

In a process of this type as is known from FR-A-14 33 626, each wheel can be shifted between three drive gears over a two-step wheel hub gearing. To satisfy different speed and torque demands, this drive is limited to the magnitude of the ratios and the adjustment range of the associated hydraulic motor. In practice it has been found that the driving range covered thereby is not sufficient. With a drive designed for high torques it is normally only possible to implement small driving speeds; a drive for high vehicle speed has most of the time inadequate torque grades.

The same problem is found in a hydrostatically driven wheel hub drive which is known from ER-A-13 60 296, and, in which, in addition to two different planet steps, the drive requirements are defined by the power range of the driving hydraulic motor.

In a process which is known from WO 91/01899, the drivable wheels of different axles are driven by transmission systems having different ratios. With a decreasing demand on load, the drive of the axles with the greatest ratio is decoupled and, when the load demand further decreases, the same is done analogously with the remaining driving axles until in an extreme case the whole drive power is transmitted from the axle with the smallest ratio. A plurality of axles are disadvantageously required for a fine adjustment of the power to be transmitted to the ground, To achieve high torques and great driving speeds, as many axles as are possible have to be used in the vehicle with transmission systems that are as finely adjusted as possible with respect to one another. This makes the drive more complex and expensive, and the vehicle cannot be used in some fields of application because of a great number of axles.

SUMMARY OF THE INVENTION

The invention is based on the technical problem to provide a process for hydrostatically driving a vehicle of the above-mentioned type, wherein the vehicle can be used under different performance requirements and can be produced and operated in a simple and inexpensive manner.

This technical problem is solved according to the invention in that the drivable wheels are driven with a first identical ratio of the transmission system before a first load limit is reached, the effective drive power of the wheels of at least one ideal axle is reduced when a first load limit is reached and the ratio of the transmission system is changed when a second load limit is reached, and the wheels driven before the first load limit are driven with the same ratio.

At the beginning, all wheels transmit the same power portion to the ground due to the initial driving of the wheels with a first identical ratio. As a result, a maximum drive power can evenly be transmitted to the ground under maximum load requirements, e.g., during start, so that the vehicle can be accelerated without any slip. If a desired speed has, e.g., been reached at this first ratio, an increased speed can be achieved by reducing the effective drive of at least one ideal axle, a high torque being still transmittable at the first ratio to the ground via the uninterruptedly driven wheels. As a result, the vehicle is also driven in this state with a great propulsive power. For example, if a second speed has been reached, the speed can further be increased by changing the ratio of the transmission system and by driving all drivable wheels, the vehicle being again driven by more axles than before the time at which the second load limit was reached. As a result, a lot of power can again be transmitted to the ground without slip via a plurality of axles. When the second load limit is reached, the ratio of the transmission system can for example be reduced, so that a higher speed can be achieved. This process can be repeated once or several times, depending on the changing capacity of the ratio of the transmission system, so that the most different torques of differentiated adjustment can be transmitted to the ground selectively with a single-axle or multi-axle drive.

First and second load limits can here be determined by external loads acting on the vehicle and by limits defined within a vehicle control. A higher speed demand or higher torque load requirements are for example possible as load limits. By analogy with the above-mentioned acceleration of a vehicle, the solution according to the invention can also be employed when the vehicle is decelerated, e.g., by stepwise downshifting.

Driving speeds of up to more than 70 km/h can be achieved in the process according to the invention, so that the drive is suited for highway and superhighway travel. At the same time, it is well suited for use in impassable terrain.

Moreover, operation after the first drive state with reduced effective drive of the wheels of at least one ideal axle saves energy and fuel, and higher speeds can be achieved at the same ratio than with the drive of all drivable wheels. This is especially advantageous under soil conditions under which for example the same multi-axle drive is not necessary or is disadvantageous.

With the solution of the invention, vehicles can produce great propulsive forces and manage grades of more than 60%. Even starting from standstill is possible in case of such grades.

The effective drive of a driven wheel is reduced in an especially advantageous manner by lowering the displacement volume of the hydraulic motor. The drive of a wheel can thereby be reduced continuously without the power as applied by the hydraulic sources being changed. A power compensation with other driven wheels is performed automatically and without jerks. The displacement volume is here the sum of all maximum changes in volume of the pressure chambers that are caused by the movement of the displacement elements during one shaft rotation or a double stroke. In hydraulic motors, this term is tantamount to the absorption capacity, and in hydraulic pumps the term is tantamount to the delivery volume. When axial piston machines are used as hydraulic motors, the displacement volume is, for example, variable by adjusting the pivoting angle.

When the ratio of the transmission system is changed, the displacement volume of the hydraulic motors is substantially set to zero in an advantageous manner. As a result, a load-free changing or shifting of the transmission system is made possible.

The transmission system is especially shifted in steps.

It is suggested that the ratio of the transmission system should be reduced from i=41 to i=6.6. The higher ratio i=41 has turned out to be of special advantage to a great propulsive power in impassable terrain or in case of extreme grades, and the smaller ratio i=6.6 is of advantage to the achievement of high speeds in case of all-wheel drive and also in case of only one driven ideal axle. At the smaller ratio i=6.6, desired maximum speeds of more than 70 km/h can be achieved in two-axle vehicles both with all-wheel drive and with only one driven axle. These ratios are for example well adapted to construction and crane vehicles. Both of the two ratios are well matched for a solution according to the invention, the ratios evenly covering a large driving speed range and a large torque load range. Ratio i means the ratio of input speed to output speed or of output torque to input torque.

The ratio of the transmission system is advantageously changed from i=12 to i=3. These ratios are very well suited for lightweight off-road vehicles, showing the above-mentioned advantages, especially for vehicles with a weight of up to 2 t.

The ratio of the transmission system is advantageously changed from i=24 to i=4. These ratios are especially well suited for driving vehicles of up to 10 t with the above-mentioned advantages being maintained.

In a variant of the invention, the displacement volume of the hydraulic source which is designed as a hydraulic pump and driven by a drive motor is substantially equal to zero and is increased upon increase in the speed of the drive motor. The drive during idling of the drive motor is thereby relieved. When the speed of the drive motor is increased, e.g. by depressing an accelerator pedal, power is transmitted to the hydraulic motors and the wheels. The displacement volume of the hydraulic pump can be increased up to the maximum to achieve maximum propulsive power of the vehicle.

In a preferred embodiment, the direction of travel is reversed by reversing the hydraulic pump. As a result, the direction of travel can be reversed by a simple change-over process on a component, i.e. the hydraulic pump.

The hydraulic motors are preferably set to displacement volume zero in the absence of fluid flow.

The hydraulic motors can especially be set, at least initially, to a maximum displacement volume for acceleration. As a result, maximum torque power of the wheel can be transmitted as drive power to the ground, so that the vehicle is given a maximum propulsive power. Maximum demands on load are thus satisfied by the drive. If the maximum load forces have been overcome, the displacement volume can be lowered again.

During acceleration, the displacement volume of the hydraulic motors is preferably reduced when the hydraulic pump has reached its maximum displacement volume. The drive power can continuously be reduced following a maximum start torque.

The displacement volume of a driven hydraulic motor can be set in an especially advantageous manner at a relatively lower value than its setpoint portion in the hydraulic pump volume. As a consequence, the power delivered by the hydraulic pump is not absorbed by the displacement volumes of the hydraulic motors, so that an increased pressure is obtained between each hydraulic motor and the hydraulic pump. The pressure is higher than would be necessary for a constant travel, so that the excessive torque is, e.g., available for an acceleration of the vehicle.

It is suggested that when a desired driving speed is reached, the speed of the drive motor should be controlled to a desired value by changing the displacement volumes of hydraulic motors and/or hydraulic pump. The drive motor can thus operate within the range of optimum injection, i.e., it runs under optimum exploitation of the fuel and with an optimum waste gas composition. The desired setpoint speed can, for example, be stored in the electronic drive means and can be aimed at by controlling hydraulic motors and/or hydraulic pump.

A substantially non-wear permanent brake is preferably activated for braking. The operative brakes of the vehicle that are prone to wear are thereby relieved. This is, for example, of great advantage during a long downhill drive in which the permanent brake takes over a considerable amount of the braking power. A power-consuming additional circuit is, for example, possible as a non-wear permanent brake.

The displacement volume of an adjustable additional hydraulic pump, which is coupled with the drive motor, can expediently be changed for changing the braking effect of the permanent brake. The braking action of the permanent brake is thereby continuously variable. The additional hydraulic pump pumps, for example, into an additional flow line in which the power transmitted by the additional hydraulic pump is consumed. The additional hydraulic pump and the additional flow line are here substantially resistant to wear.

A pressure limiting valve is preferably adjusted in an additional flow line into which the additional hydraulic pump pumps so as to vary the braking action of the permanent brake. The pressure limiting valve is adjustable in an easy manner, e.g. via the electronic drive means; the adjustment effects a changed power consumption in the additional flow line, so that the same can simulate different drive resistances to the drive motor.

In a special manner, the flow delivered by the additional hydraulic pump can be guided into the additional flow line during driving and can be guided into an operative flow circuit during operation. The additional hydraulic pump of the operative flow circuit which acts as a hydraulic source can thus be used as a permanent brake during driving at the same time.

In case of slip of a driven wheel, the displacement volume at least of the hydraulic motor driven by said wheel is reduced in a preferred embodiment. The respective torque transmitted to the ground is reduced by reducing the displacement volume; in an extreme case, the displacement volume of the hydraulic motor is set to zero.

This is of special advantage to a drive slip control of the vehicle. If the drive torque transmitted to a wheel can no longer be transmitted to the ground and if individual wheels slip partly or entirely (positive slip), the respective drive torque is reduced via the displacement volume of the hydraulic motor until the wheel no longer tends to spin. Hence, especially when the vehicle is accelerated, track stability is maintained.

This process is also of advantage when the vehicle is decelerated by exploiting the drag torque of the drive motor. If the drive drag is so great that a wheel tends to lock on the ground (negative slip), the displacement volume of the associated hydraulic motor is reduced to such an extent that the drive motor is reduced and its speed decreases. In an extreme case, the displacement volume of the hydraulic motor is fully set to zero, i.e. no torque on the wheel, and the drive motor is idling. All of the hydraulic motors can selectively be adjusted, or only the hydraulic motor of the wheel that tends to lock.

The ratio of the difference of circumferential wheel speed and effective vehicle speed to the circumferential wheel speed is defined as slip.

A reference value is preferably formed from the speeds of the driven wheels, the speed of each driven wheel is compared with the reference value and the displacement volume of the hydraulic motor of this wheel is changed in response to the deviation of a speed of a driven wheel from the reference value. The slip of a wheel can easily be detested through this process, for example, by the electronic drive means. Locking of the wheels and spinning of the wheels are arithmetically determined and the displacement volume of the hydraulic motor is then changed to reduce slip. The arithmetical mean value can, e.g., be used as a reference value.

The permanent brake can expediently be deactivated during braking with the antilocking system. As a result, the permanent brake no longer develops any braking action on the drive wheels, so that the antilocking system is not impaired in its effect.

During braking with the antilocking system, the drive motor is set to idling as a variant of the invention. This reduces the braking action by the motor drag on the wheels, so that the antilocking system remains unaffected in its effect.

During braking with the antilocking system, the displacement volumes of the hydraulic pump and/or the hydraulic motors of the driven wheels are preferably set to zero. This minimizes the drive force of the hydraulic pump and/or the hydraulic motors transmitted onto the wheels, so that the antilocking system remains unaffected in its effect.

A displacement volume of the hydraulic motors is possibly assigned to a drive speed. This saves control circuits for determining the state of the hydraulic motors, the drive states are predominantly controlled via the drive motor, for example by an operator adjusting the accelerator pedal, and the displacement volume of the hydraulic pump is optionally adjusted.

The process of the invention can be carried out with a hydrostatic drive having at least two ideal axles of which each comprises at least one drivable wheel, each drivable wheel being connected to at least one hydraulic motor connected to at least one hydraulic source, and a transmission system being arranged between each hydraulic motor and the associated wheel, and the ratio of the transmission system being variable.

The transmission system preferably comprises shiftable gear ratios. In cooperation with the adjustable hydraulic motors or the hydraulic source, it is thereby possible to define various ranges which are covered by the possibilities of adjustment of the hydraulic motors or the source at a fixed ratio. These ranges can follow each other or at least partly overlap by correspondingly choosing the shift steps.

The smallest ratio is advantageously i=6.6. This ratio has turned out to be advantageous to achieve speeds of more than 70 km/h, for example with a crane vehicle having a conventional drive motor, which speeds make the vehicles suitable for superhighway travel.

The greatest ratio is possibly i=41. This produces a high propulsive power with a conventional drive motor and hydraulic source for managing grades in the range of 60% even from a standstill.

A greater ratio is especially i=12, and a smaller ratio is i=3. These ratios are of advantage to lightweight off-road vehicles, especially up to a weight of 2 t.

In a variation, a greater ratio is i=24, and a smaller ratio is i=4. This combination of ratios is especially advantageous for vehicles up to a weight of 10 t.

The transmission system is preferably fully integrated into the wheel hub. The transmission system can thus be accommodated in a space-saving manner in the wheel hub, so that the space between the individual wheels or ideal axles can be exploited for bearing vehicle parts or other vehicle units.

The transmission system can expediently be a two-step planetary transmission. Transmissions of this type are of a very small and compact structure, and such a structure can implement gear ratios of the most different combinations and sizes. Moreover, a planetary transmission is especially suited as a wheel hub drive.

In a preferred manner, the transmission system comprises a shiftable idling position. The wheels can thereby be separated entirely from the remaining drive, so that a torque-free wheel state can be shifted independently of the operative state of the remaining drive. This turns out to be of great advantage in an antilocking system, an antislip control or a drive-motor drag control.

In a variation, the transmission system has a shiftable locking position. Independently of additional brake devices, the vehicle can thus only be braked by shifting the transmission system. When the vehicle is at a standstill, the locking position can be used as a parking brake.

The transmission system can specifically be provided with hydrostatic actuation means for changing the ratio or for shifting purposes. The hydrostatic actuation means can be coupled with the hydrostatic travel drive or may have a hydrostatic energy source of their own.

The hydraulic source is advantageously connected via a distributing gearbox to a drive motor. The drive motor drives the hydraulic source which may, for example, be designed as a hydraulic pump, the power transmitted from the drive motor being converted by the distributing gearbox into the desired values before the hydraulic source.

The distributing gearbox can specifically be connected to at least one additional consumer. Apart from the function as a travel drive, the drive motor can for example serve as a drive for a tool.

An adjustable hydraulic pump possibly pumps as an additional consumer selectively into an operative flow circuit or into an additional flow line acting as a substantially non-wear permanent brake. The adjustable hydraulic pump can drive a tool as a hydraulic source or can loadingly act on the drive motor, for example during travel operation, through a power-consuming additional flow line. The load exerted by the additional flow line brakes the drive motor which, in turn, has a braking effect on the travel drive due to its drag. This will for example relieve the operating brake of the vehicle considerably during constant downhill travel.

The distributing gearbox can expediently be connected to a feed pump of the drive circuit. The drive circuit is thereby constantly supplied automatically with sufficient hydraulic fluid via the feed pump in the running state of the drive motor.

The feed pump preferably feeds a directional circuit of the hydraulic source. This ensures that in the running state of the drive motor the hydraulic source can be constantly switched. The direction of travel of a vehicle can be changed via the directional circuit.

Embodiments of the invention will be explained hereinafter.

DETAILED DESCRIPTION OF THE PREFERRED EMBODIMENTS

Figure 1:
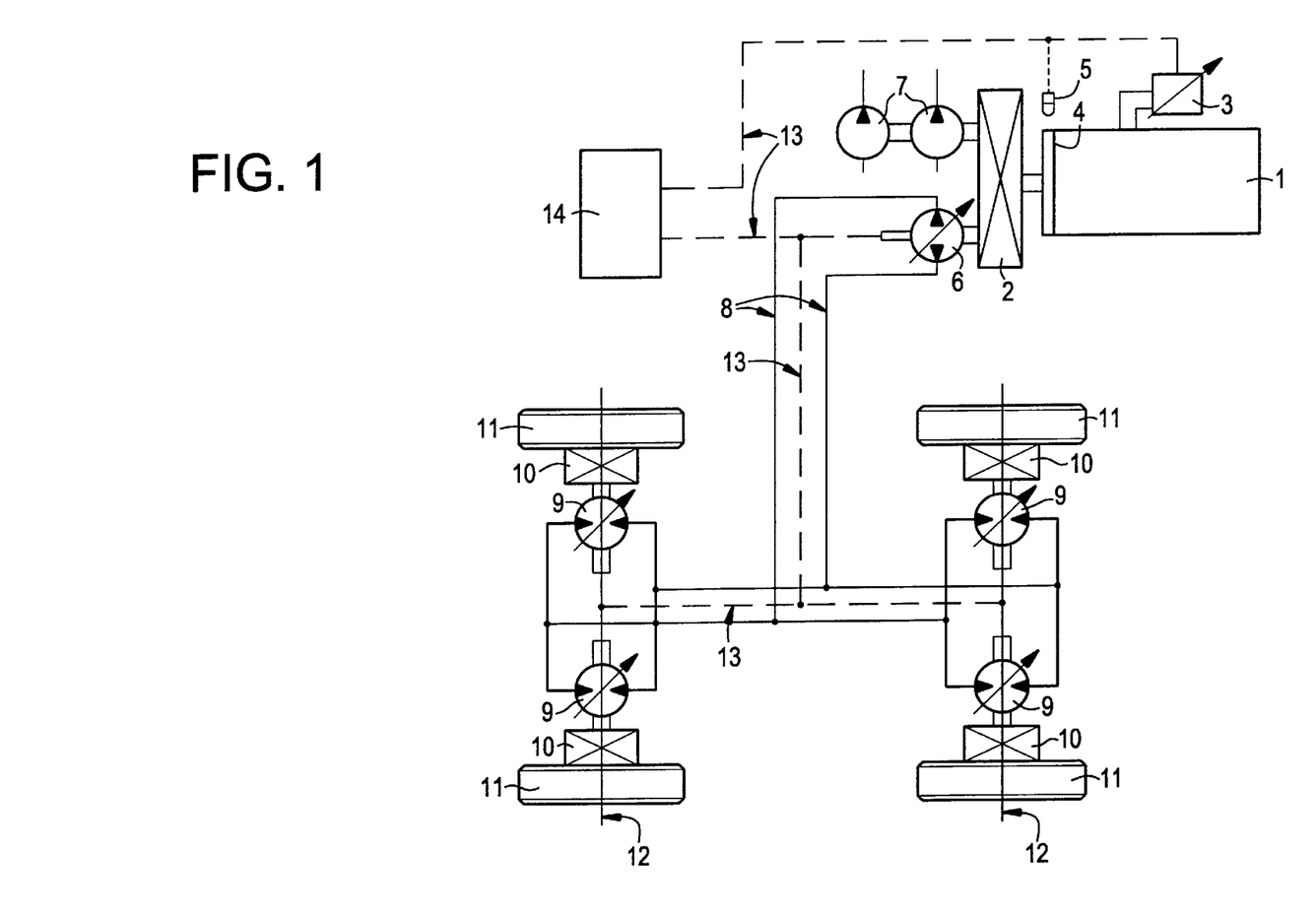
FIG. 1 shows a schematic circuit diagram of a hydrostatic drive for a two-axle vehicle.

FIG. 1 shows a drive motor 1 which is connected to a distributing gearbox 2. The drive motor 1 is connected to an accelerator pedal 3. It comprises a starter ring gear 4 which has oriented thereto a tachometer 5.

The distributing gearbox 2 is connected on a drive train to an adjustable hydraulic pump 6 with two flow directions and on a second drive train to two successively arranged additional hydraulic pumps of a constant displacement volume and one flow direction. The hydraulic pump 6 is connected via hydraulic lines 8 to a total of four hydraulic motors 9 having a variable displacement volume and two flow directions. Each of the hydraulic motors 9 is coupled via a variable transmission system 10 with a wheel 11. Two wheels 11 are respectively located on one ideal axle 12. The hydraulic motors 9 of one respective ideal axle 12 are connected in parallel with those of the other ideal axle 12, and the hydraulic motors 9 of the same ideal axle 12 are again connected in parallel with each other. Each wheel 11 is individually driven by a hydraulic motor 9.

The hydraulic motors 9, the hydraulic pump 6, the tachometer 5 and the accelerator pedal 3 are connected via control lines 13 to a control unit 14.

Figure 2:
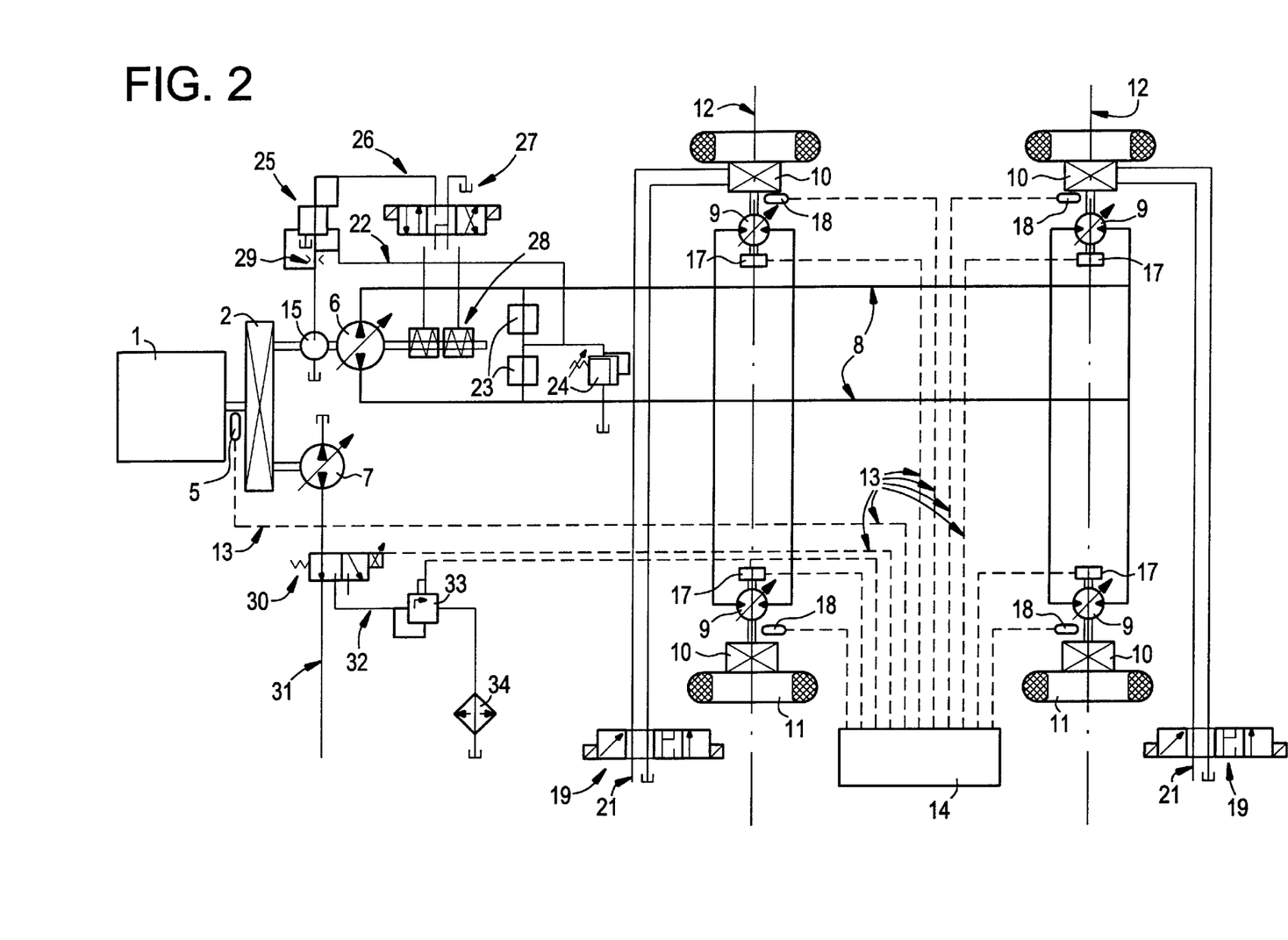
FIG. 2 shows a schematic circuit diagram of a hydrostatic drive for a two-axle vehicle with reverse shifting of the hydraulic source and wear-resistant permanent brake.

In FIG. 2, the drive motor 1 is also connected to the distributing gearbox 2, and a tachometer 5 which is connected via a control line 13 to a control unit 14 senses the drive speed of the drive motor 1. The distributing gearbox 2 is connected in a first drive train to a feed pump 15 and the hydraulic pump 6 which acts as a hydraulic source. Feed pump 15 and hydraulic pump 6 are connected in series.

The hydraulic pump 6 with the adjustable displacement volume and two flow directions is connected via hydraulic lines 8 to four hydraulic motors 9 which are each connected via a transmission system 10 to a wheel 11. Two wheels 11 are respectively located on an ideal axle 12. The hydraulic motors 9 of two ideal axles 12 are connected in parallel with each other, and the hydraulic motors 9 of the same ideal axle 12 are also connected in parallel with each other. Each of the hydraulic motors 9 has an adjustable displacement volume and two flow directions.

Each of hydraulic motors 9 is connected to an adjusting unit 17 for adjusting the displacement volume. The adjusting units 17 are connected via control lines 13 to the control unit 14. An output tachometer 18 which is connected via a control line 13 to control unit 14 is respectively arranged between transmission system 10 and hydraulic motor 9.

The transmission systems 10 of an ideal axle 12 are connected via hydraulic lines 8 to an electromagnetically adjustable 4/4-port directional control valve 19 via which the various ratios of the transmission system 10 can be selected. At the supply side, each of the 4/4-port directional control valves 19 comprises a container feed line 20 and a pump feed line 21.

The volume flow produced by the feed pump 15 is guided via a feed line 22 and a respective check valve 23 into the supplying or discharging hydraulic line 8 of the hydraulic pump 6. A spring-loaded, infinitely variable pressure limiting valve 23 is connected to the feed line 22.

Furthermore, the feed pump 15 is connected via a proportional pressure control valve 25 to a directional circuit 26. In the direction of circuit 26, the proportional pressure control valve 25 is followed by an electromagnetically adjustable 4/3-port directional switching valve which operates a double-acting, double spring-loaded cylinder 28. The cylinder 28 is mechanically connected to the hydraulic pump 6 and controls the displacement volume and direction of flow of the hydraulic pump 6. A differential pressure metering plate 29 is connected to the proportional pressure control valve 25.

A progressively adjustable additional hydraulic pump 7 with one flow direction is arranged on the second drive train of the distributing gearbox 2. The additional hydraulic pump 7 pumps via a 3/2-port directional control valve 30 selectively into an operative flow circuit 31 or an additional flow line 32. An electromagnetically adjustable pressure limiting valve 33 and a cooler 34 are arranged on the additional flow line 32. The electromagnetically adjustable pressure limiting valve 33 is connected via a control line 13 to the control unit 14.

Figure 3:
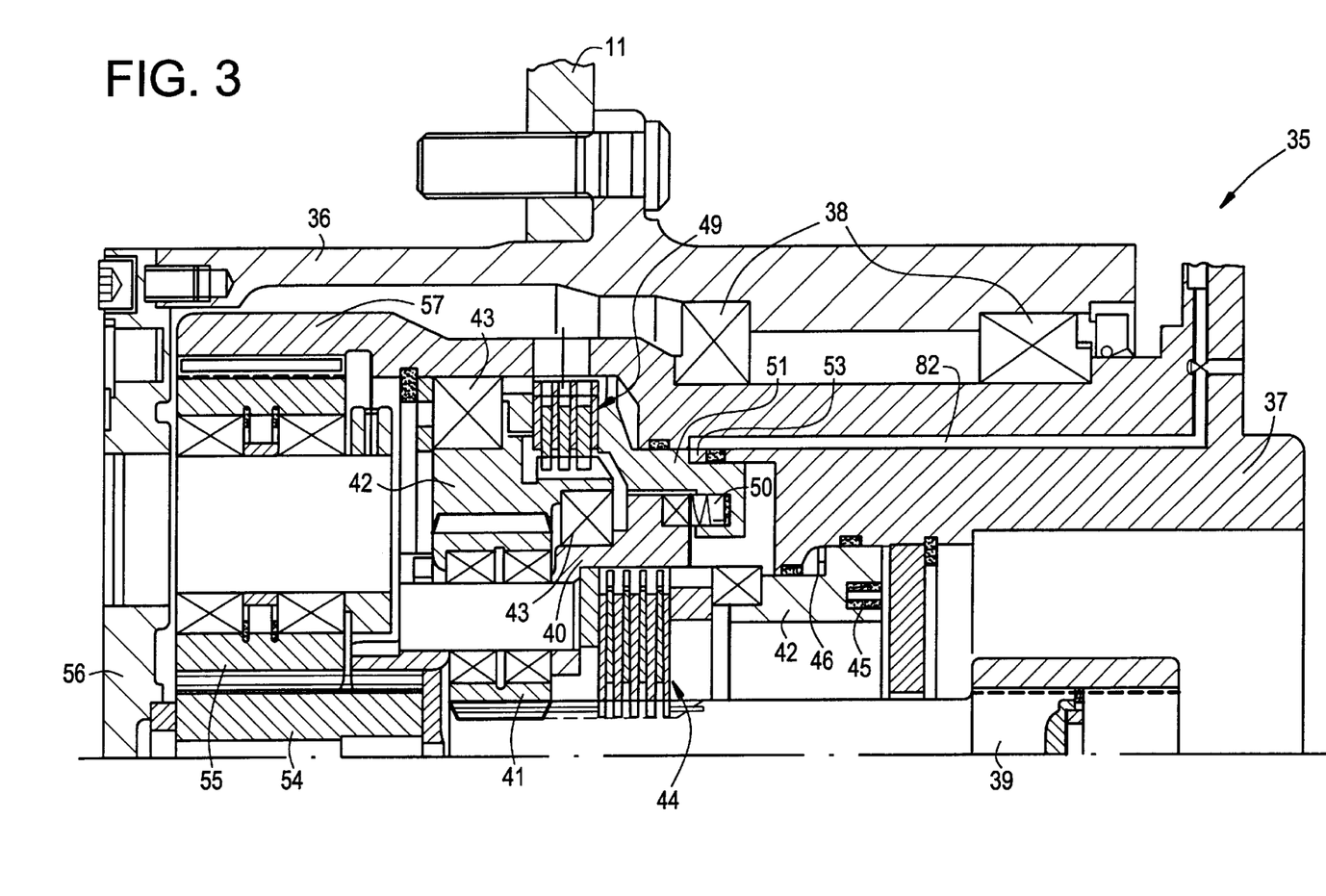
FIG. 3 is a first semi-section of a two-step planetary transmission with illustrated planet gears.
Figure 4:
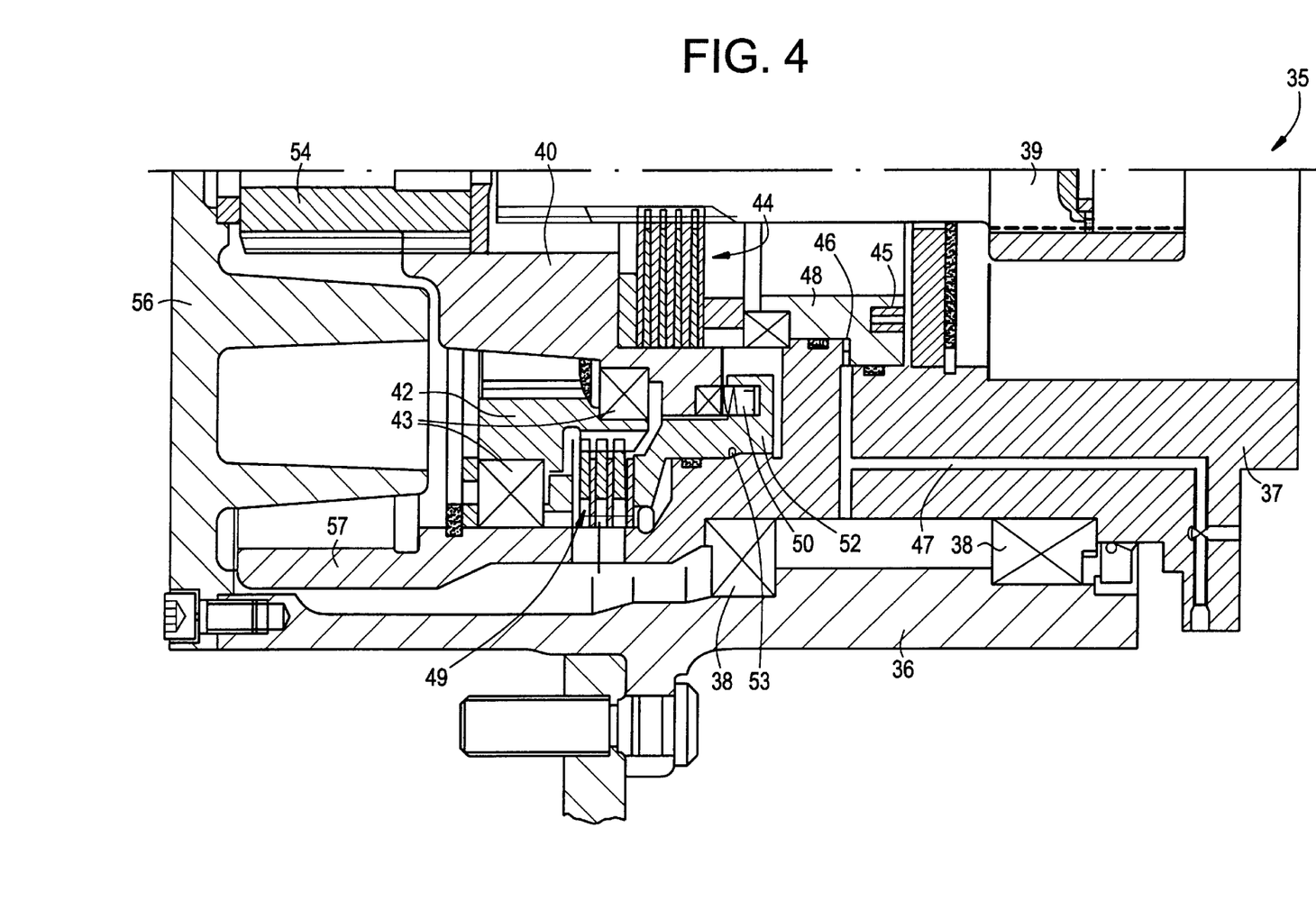
FIG. 4 is a second semi-section of a two-step planetary transmission.

A two-step planetary transmission 35 is shown in FIGS. 3 and 4, each in semi-section. The planetary transmission 35 is designed as an integrated wheel hub transmission and has on the exterior a wheel carrier 36 on which a wheel 11 can be mounted. At the vehicle side, the planetary transmission 35 is firmly connected via the hub member 37 to a vehicle member. The wheel carrier 36 is rotatably supported on the hub member 37 via first roller bearings 38. A drive shaft 39 which has an external toothing on its one end is centrically arranged in the hub member 37.

The drive shaft 39 serves as a sun of a first planet step with a first planet carrier 40 on which a first planet gear 41 is rotatably supported. The first planet gear 41 engages internally into the drive shaft 39 and externally into a first ring gear 42. The first ring gear 42 is rotatably supported via second roller bearings 43 internally relative to the first planet carrier 40 and externally relative to the hub member 37.

A first multi-disc clutch 44 is arranged between first planet carrier 40 and drive shaft 39. The first multi-disc clutch 44 is loaded by a first spring 45 and is therefore closed. In the closed state of the first multi-disc clutch 44, drive shaft 39, first planet carrier 40 and first planet gear 41 are firmly interconnected.

A first actuation chamber 46 can be subjected to pressure via a first line 47, which extends through the hub member 37, so that the first spring 45 can be counteracted via a first intermediate member 48 and the first multi-disc clutch 44 can be relieved, i.e. it can be opened. In this case, the first planet gear 41, the planet carrier 40 and the drive shaft 39 are movable relative to each other.

A second multi-disc clutch 49 is arranged between the first ring gear 42 and hub member 37. The second multi-disc clutch 49 is relieved via a second spring 50 and a second intermediate member 51, so that first ring gear 42 and hub member 37 are rotatable relative to each other, A second actuation chamber 53 can be subjected to pressure via a second line 52, so that the second spring 50 can be counteracted and the second multi-disc clutch 49 can be closed. In this case, first ring gear 42 and hub member 37 are non-rotatably interconnected.

The first planet carrier 40 is interlocked with a sun shaft 54 arranged in extension of drive shaft 39. Sun shaft 54 is in engagement with a second planet gear 55 that is rotatably supported on a second planet carrier 56. The second planet carrier 56 is firmly connected to the wheel carrier 36. The second planet gear 55 externally engages into a second ring gear 57 formed on the hub member 37.

The first multi-disc clutch 44 is designed with a 1.8 safety factor and the second multi-disc clutch 49 with a 1.5 safety factor.

The function and operation of the two-step planetary transmission as illustrated in the drawing shall now be explained in more detail in the following:

The drive shaft 39 is, e.g., driven by a hydraulic motor 9, the first and second actuation chambers 46, 53 being initially without pressure. As a consequence, the first multi-disc clutch 44 is closed and the second multi-disc clutch 49 is open. Drive shaft 39, first planet carrier 40, first planet gear 41, first ring gear 42 and sun shaft 44 are non-rotatably interconnected. The drive torque is transmitted to the second planet carrier 56 only via the second planet gear 55 which is supported on the stationary second ring gear 57. The carrier transmits the torque in an unchanged form via the wheel carrier 36 to a wheel 11 to be driven. In this case, a first gear ratio is, for example, i=6.6.

In a second shift state, the two actuation chambers 46, 53 are subjected to pressure, so that the first multi-disc clutch 44 is opened and the second multi-disc clutch 49 is closed. As a consequence, the first ring gear 42 is non-rotatably connected to the stationary hub member 37, and a torque supplied by the drive shaft 39 is transmitted via the first planet gear 41, which is supported on the first ring gear 42, via the first planet carrier 40 to the sun shaft 54 which, in turn, transmits the drive power to the second planet gear 55 supported on the second ring gear 57, and passes the power on to the second planet carrier 56. In this case, the two planet steps which are connected in series transmit the drive torque to the second planet carrier and to a wheel 11 to be driven. In this case, the gear ratio is, for example, i=41.

When the first actuation chamber 46 is without pressure and the second actuation chamber 53 is subjected to pressure, the two multi-disc clutches 44, 49 are closed and all transmission parts are non-rotatably interconnected; the planetary transmission blocks. However, since the two multi-disc clutches 44, 49 are designed with different safety factors, the multi-disc clutch having the smaller safety factor, i.e. in this case the second multi-disc clutch 49, will slip against its own frictional resistance under very great torque loads. In the blocking position, this protects the transmission against destruction caused by excessive torque forces.

When the first actuation chamber 46 is subjected to pressure and the second actuation chamber 53 is without pressure, the two multi-disc clutches 44, 49 are opened and the planetary transmission is in an idle position; no torque is transmitted to wheel 11.

The two-step planetary transmission 35 can be used as a transmission system 10 in circuits of FIGS. 1 and 2.

The function and mode of operation of the circuits of a hydrostatic drive as illustrated in FIGS. 1 and 2 shall now be explained in more detail:

The drive motor 1 which is, e.g., designed as a diesel engine drives the hydraulic pump 6 via the distributing gearbox 2. The displacement volume of the hydraulic pump 6 can be adjusted independently of the drive speed of the drive motor 1, for example, by way of an electrically proportional adjustment. During idling, the hydraulic pump 6 is in the zero position; when the drive speed is increased through the accelerator pedal 3, the hydraulic pump 6 is automatically swung outwards. The vehicle accelerates.

At the wheel side, the hydraulic motors 9 are at a displacement volume of 0 in the absence of fluid flow and are set to a maximum upon the start of the drive motor 1. In response to the driving speed and to the drive motor speed, the hydraulic motors 9 reduce their displacement volume, thereby accelerating the vehicle. To achieve high driving forces on the one hand, e.g., for off-road travel, and to achieve high speeds on the other hand, e.g., for superhighway travel, the mechanical gear ratio of the transmission system 10 is changed in addition to the adjustment ranges of the hydraulic pump 6 and the hydraulic motors 9. At the time of gearshifting, the hydraulic motors 9 are set to a displacement volume of 0 to shift in an unloaded manner.

Upon starting, the transmission Systems of the drivable wheels 11 are shifted to a high gear ratio, e.g., i=41, and all hydraulic motors 9 are operated at the same high displacement volume. The vehicle starts with a permanent all-wheel drive and therefore with maximum traction. When a first driving state is reached, e.g., a maximum speed of about 13 km/h, the displacement volume of the hydraulic motors 9 of an ideal axle 12 is reduced in a continuously variable manner to zero, so that it is only the remaining ideal axle 12 that drives. Driving will be performed with the hydraulic motors 9 of an ideal axle 12 until a second driving state is reached, i.e., up to a maximum driving speed of 26 km/h.

The transmission systems 10 are then shifted to a second smaller gear ratio, e.g., i=6.6., and the hydraulic motors 9 of both ideal axles 12 are again driven with the same displacement volume. In this shift position, a maximum speed of about 75 km/h can be achieved in the all-wheel drive at excellent traction.

For permanent operation on roads, for example superhighway travel, the displacement volume of the hydraulic motors 9 of an ideal axle 12 is again reduced and set to zero, so that the hydraulic motors of an ideal axle 12 now drive. As a result, a very high efficiency with good fuel consumption values is achieved at a maximum speed of up to 75 km/h.

These driving states can be repeated as often as wanted, depending on the number of the gear ratios of the transmission systems 10, or can also be carried out for reverse driving with reverse delivery flow of the hydraulic pump.

The hydrostatic drive is controlled by control unit 14 which measures the speeds of the hydraulic motors 9 via the output tachometer 18 and measures the drive speed of the drive motor 1 via tachometer 5. Likewise, the displacement volume of the hydraulic motors 9 and of the hydraulic pump 6 can be varied via control unit 14. Likewise, elements which are connected via control lines 13, for example the differential pressure valves 24, 33 or the proportional pressure control valve 25, can be activated. The same is true for all switchable valves 19, 27, 30.

To accelerate the vehicle, the motor speed of the drive motor 1 is increased by depressing the accelerator pedal 3, so that the displacement volume of the hydraulic pump 6 is increased. At the beginning, the hydraulic motors 9 have maximum displacement volumes, but are set back to smaller displacement volumes in case of maximum displacement volumes of the hydraulic pump 6. The displacement volumes of the hydraulic motors 9 are ahead or their setpoint portion of the pump delivery volume to such a degree that the drive motor 1 is reduced with respect to its desired speed by a specific amount. This produces a higher pressure than would be required for instantaneous constant travel between hydraulic pump 6 and hydraulic motors 9, so that an excessive torque is available at wheel 11 for acceleration.

If the drive motor 1 is excessively reduced, the advance of the hydraulic motors 9 is slightly reduced, so that the maximum driving speed is achieved at a setpoint drive speed of the drive motor 1.

A reduction of the drive motor at every preselected setpoint speed ensures that the motor always operates in the range of optimum injection, i.e., best fuel exploitation and optimum waste gas composition.

If the accelerator pedal is reduced in a range of 100% to 30% of the load, the vehicle begins to roll and slows down due to driving resistances. The speed of the drive motor 1 decreases to a new setpoint value and the hydraulic motors are subsequently adjusted to smaller displacement volumes. When the driving speed of the new setpoint speed of the drive motor 1 is reached, the hydraulic pump 6 will again build up high pressure and the hydraulic motors will again set the driving speed to a new setpoint value.

If the accelerator pedal 3 is reduced in a range of from 30% to 0% of the load, the driving resistances and the drag torque of the drive motor 1 have a braking effect. The displacement volumes of the hydraulic motors 9 are proportionally increased, so that the drag of drive motor 1 is intensified.

If a wheel 11 spins individually or completely, the displacement volume on the associated hydraulic motor 9 will be reduced until wheel 11 no longer spins. In an extreme case, the respective hydraulic motor 9 will completely be set to zero, i.e no torque at wheel 11.

An average value with which the individual speeds are compared is formed from the speeds measured by the output tachometers 18 as a measure of the spinning of an individual wheel 11. If a wheel speed deviates from the average value excessively, the respective driving torque will be reduced by the control unit 14 by reducing the displacement volume until the speed is again matched to the average value. A driving slip control can thereby be realized.

By analogy, when a wheel 11 locks, the displacement volume of the hydraulic motors 9 will be reduced until the drag produced by the drive motor 1 on wheels 11 is so small that wheel 11 no longer tends to lock. This corresponds to a drag torque control of the motor.

Alternatively, it is possible to activate a non-wear permanent brake. Part of the drive power of the drive motor 1 is here passed via the distributing gearbox 2 to the additional hydraulic pump 7 which pumps into the additional flow line 32 during driving. The pressure which the hydraulic pump can build up in the additional flow line 32 can be limited through the pressure limiting valve 33. The cooler 34 discharges the produced heat. The drive power which is output via the additional flow line 32 is varied by adjusting the displacement volume of the additional hydraulic pump 7. The drive power has an inhibiting effect on the drive motor 1 and is transmitted via an increased motor drag onto the hydraulic motors 9. The hydrostatic travel drive is thereby braked.

If braking is performed via the operative brake with the antilocking system, the permanent brake is de-energized, e.g. by reducing the displacement volume of the additional hydraulic pump 7, and the drive motor 1 is set to idling. The hydraulic pump 6 and the hydraulic motors 9 are both set to zero displacement volume.

To feed the hydraulic lines 8 connected to the hydraulic pump 6 constantly with sufficient hydraulic fluid, the feed pump 15 constantly ensures a sufficient pressure level which optimally fills the hydraulic lines 8, namely through the feed line 22 and the check valves 23. The pressure which can be built up by feed pump 15 in feed line 22 Is adjusted via the pressure limiting valve 24.

The volume flow delivered by the feed pump 15 is measured via the differential pressure metering plate 29. The cylinder 28 is operated via the 4/3-port directional switching valve 27. The flow direction of the pump can be controlled via cylinder 28 and the displacement volume of the hydraulic pump 6 can possibly be adjusted as well. The cylinder 28 can be controlled via the proportional pressure control valve 25 in response to the volume flow measurement of the differential pressure metering plate 29 in such a manner that the displacement volume of the hydraulic pump 6 is controlled in response to the speed of the drive motor 1. The volume flow produced by the feed pump 15 and measured via the differential pressure metering plate 29 is a reference value for the speed-dependent control.

Optionally, the control unit 14 can exactly assign a displacement volume of each hydraulic motor 9 to every driving speed. The hydrostatic drive Is here operated with a motor control. This motor control can be superimposed, at least portionwise, by a corresponding motor control, whereby under specific load requirements and in specific operative states the drive motor 1 is influenced by regulating the displacement volumes of the hydraulic motors 9 and/or the hydraulic pump 6.

During operation, the entire drive power of drive motor 1 is transmitted via the distributing gearbox 2 to the additional hydraulic pump 7. The additional hydraulic pump 7 delivers the whole volume flow into the operative flow circuit 31 by correspondingly switching the 3/2-port directional control valve 30. Tools, such as telescopic arm, bucket, hoisting winch, or the like, are operated via the operative flow circuit 31. During operation the hydrostatic traveling drive can be entirely uncoupled from the drive via the distributing gearbox 2. Optionally, this is also achievable through an idle position of the transmission system or through zero position of the displacement volumes of hydraulic pump 6 or hydraulic motors 9.

I claim:

1. A process for hydrostatically driving a vehicle, the vehicle comprising at least two ideal axles each of which comprises at least one drivable wheel, each drivable wheel being driven by at least one hydraulic motor connected to at least one hydraulic source, the drive power of each hydraulic motor being transmitted via a transmission system to the respective wheel, wherein said process comprises steps of:

before a first load limit is reached, driving said drivable wheels with a first identical ratio of said transmission system; and when a first load limit is reached, reducing the effective drive of said wheels of at least one ideal axle; and when a second load limit is reached, changing the ratio of said transmission system whereby said wheels driven before said first load limit are driven with the same ratio.

2. A process according to claim 1, wherein the effective drive power of a driven wheel is reduced by lowering the displacement volume of the associated hydraulic motor.

3. A process according to claim 2, wherein when the ratio of said transmission system is changed, the displacement volumes of said hydraulic motors are substantially set to zero.

4. A process according to claim 2, wherein said transmission system is shifted in steps.

5. A process according to either of claims 2 or 4, wherein the ratio of said transmission system is changed from i=41 to i=6.6.

6. A process according to either of claims 2 or 4, wherein the ratio of said transmission system is changed from i=12 to i=3.

7. A process according to either of claims 2 or 4, wherein the ratio of said transmission system is changed from i=24 to i=4.

8. A process according to either of claims 2 or 4, wherein the hydraulic source includes a hydraulic pump driven by a drive motor, and the displacement volume of said hydraulic source is substantially equal to zero during idling of said drive motor and is increased when the drive motor speed is increased.

9. A process according to either of claims 1 or 2, wherein the driving direction is reversed by reversing a hydraulic pump of the hydraulic source.

10. A process according to either of claims 1 or 2, wherein said hydraulic motors are set to a zero displacement volume in the absence of fluid flow.

11. A process according to either of claims 1 or 2, wherein said hydraulic motors are at least initially set to maximum displacement volume for acceleration.

12. A process according to claim 1, wherein upon acceleration, the displacement volume of said hydraulic motors is reduced when a hydraulic pump has reached a maximum displacement volume.

13. A process according to either of claims 1 or 2, wherein the displacement volume of a drivable hydraulic motor is set to a relatively lower level than its setpoint portion in a hydraulic pump volume.

14. A process according to either of claims 1 or 2, wherein, when a desired driving speed is reached, the speed of said drive motor is set to a desired value by changing the displacement volumes of at least one of the hydraulic motors and a hydraulic pump.

15. A process according to either of claims 1 or 2, wherein a substantially non-wear permanent brake is activated for braking.

16. A process according to claim 15, wherein the displacement volume of an adjustable additional hydraulic pump coupled with said drive motor is changed for changing the braking action of said permanent brake.

17. A process according to claim 16, wherein a pressure limiting valve is adjusted in an additional flow line into which said additional hydraulic pump pumps so as to vary the braking action of said permanent brake.

18. A process according to claim 13, wherein the flow delivered by said additional hydraulic pump is directed into said additional flow line during travel and is directed into an operative flow circuit during operation.

19. A process according to either of claims 1 or 2, wherein upon slip of a driven wheel the displacement volume of at least the hydraulic motor which drives said wheel is reduced.

20. A process according to claim 15, wherein a reference value is formed from the speeds of said driven wheels, the speed of each driven wheel is compared with said reference value, and the displacement volume of said hydraulic motor of said wheel is changed in response to the deviation of a speed of said driven wheel from said reference value.

21. A process according to claim 15, wherein said permanent brake is switched off during braking with an antilocking system.

22. A process according to claim 21, wherein said drive motor is set to idling during braking with an antilocking system.

23. A process according to either of claims 1 or 2, wherein the displacement volumes of at least one of a hydraulic pump and hydraulic motor of said driven wheels are set to zero during braking with an antilocking system.

24. A process according to either of claims 1 or 2, wherein a displacement volume of said hydraulic motors is assigned to a vehicle speed.

25. A hydrostatic drive for performing the process according to claim 1, the hydrostatic drive comprising: at least two ideal axles each of which comprises at least one drivable wheel, each drivable wheel being connected to at least one hydraulic motor connected to at least one hydraulic source, and a transmission system arranged between each of said hydraulic motors and the associated wheel, wherein the ratio of said transmission system is variable.

26. A hydrostatic drive according to claim 25, wherein said transmission system has shiftable ratios.

27. A hydrostatic drive according to either of claims 25 or 26, wherein the smallest ratio of the transmission system is i=6.6.

28. A hydrostatic drive according to claim 27, wherein the greatest ratio of the transmission system is i=41.

29. A hydrostatic drive according to either of claims 25 or 26, wherein a greater ratio of the transmission system is i=12 and a smaller ratio of the transmission system is i=3.

30. A hydrostatic drive according to either of claims 15 or 26, wherein a greater ratio of the transmission system is i=24 and a smaller ratio of the transmission system is i=4.

31. A hydrostatic drive according to either of claims 25 or 26, wherein said transmission system is fully integrated into a wheel hub.

32. A hydrostatic drive according to claim 31, wherein said transmission system is a two-step planetary transmission.

33. A hydrostatic drive according to either of claims 25 or 26, wherein said transmission system has a shiftable idle position.

34. A hydrostatic drive according to either of claims 25 or 26, wherein said transmission system has a shiftable blocking position.

35. A hydrostatic drive according to either of claims 25 or 26, wherein said transmission system is provided with hydrostatic actuation means for varying the ratio or for shifting.

36. A hydrostatic drive according to either of claims 25 or 26, wherein said hydraulic source is connected via a distribution gearbox to a drive motor.

37. A hydrostatic drive according to claim 36, wherein said distribution gearbox is connected to at least one additional consumer.

38. A hydrostatic drive according to claim 37, wherein an adjustable hydraulic pump is provided as an additional consumer and pumps selectively into an operative flow circuit or into an additional flow line acting as a substantially non-wear permanent brake.

39. A hydrostatic drive according to claim 36, wherein said distribution gearbox is connected to a feed pump of the drive circuit.

40. A hydrostatic drive according to claim 39, wherein said feed pump feeds a directional circuit of said hydraulic source.

41. A process according to claim 16, wherein said permanent brake is switched off during braking with an antilocking system.

* * * * *

UNITED STATES PATENT AND TRADEMARK OFFICE
CERTIFICATE OF CORRECTION

PATENT NO. : 5,848,664

DATED : December 15, 1998

INVENTOR(S) : Ernst KASPAR

It is certified that errors appear in the above-identified patent and that said Letters Patent is hereby corrected as shown below:

Column 1:
    Line 30, change "ER-A-13" to read as --FR-A-13--.
Column 5:
    Line 11, change "detested" to read as --detected--.
Column 10:
    Line 14, change "Systems" to read as --systems--.
Column 12:
    Line 18, change "Is" to read as --is--.

IN THE CLAIMS:
Column 13:
    Claim 12, line 1, change "1" to read as --11--.
    Claim 18, line 1, change "13" to read as --17--.
    Claim 23, line 1, change "2" to read as --22--.
Column 14:
    Claim 30, line 1, change "15" to read as --25--.

Signed and Sealed this

Nineteenth Day of October, 1999

Attest:

Q. TODD DICKINSON

*Attesting Officer*    *Acting Commissioner of Patents and Trademarks*